F. T. DICKINSON.
BRAKE SHOE.
APPLICATION FILED NOV. 2, 1908.
1,042,896.
Patented Oct. 29, 1912.
4 SHEETS—SHEET 1.
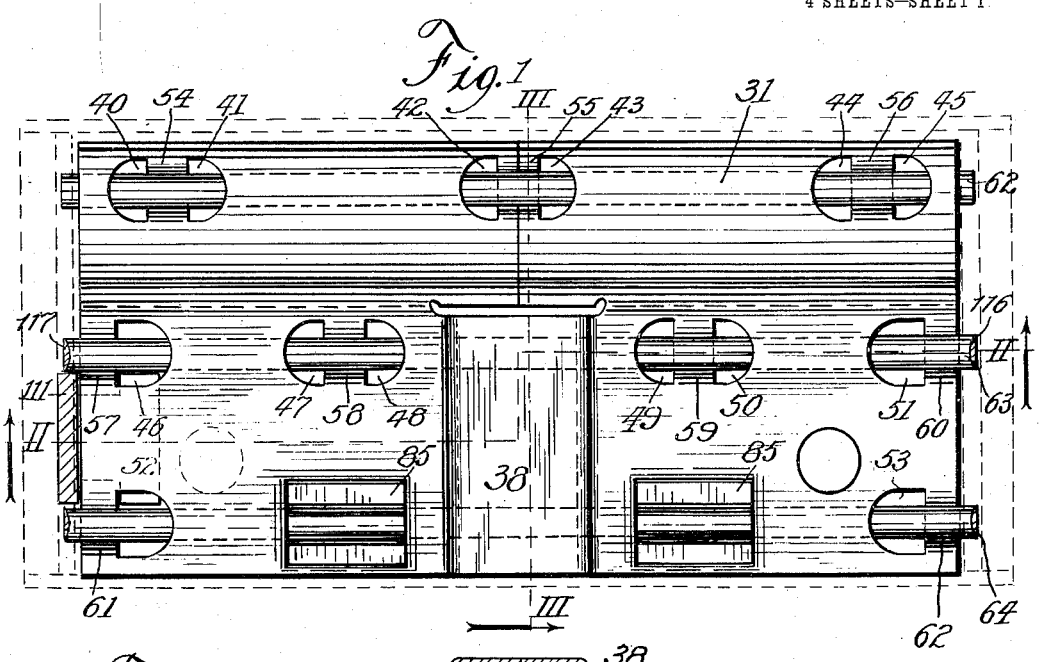
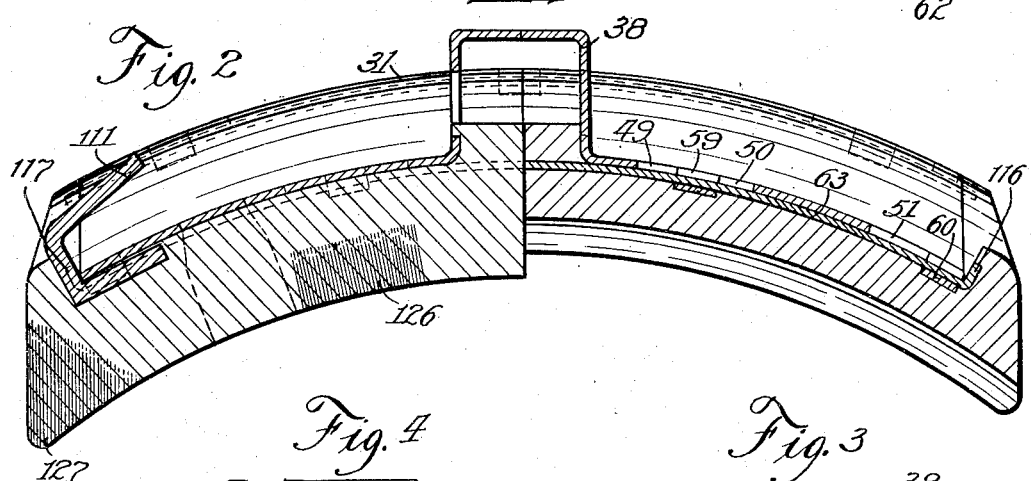
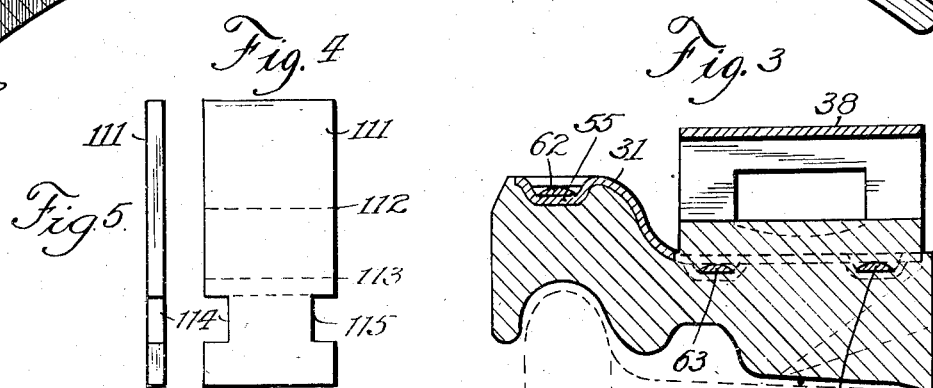
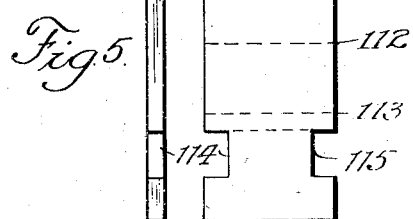
WITNESSES
A. Y. Andrews
G. W. Cunningham
INVENTOR
Frank T. Dickinson
by Lynn, Stead & Carpenter
his Attorneys F. T. DICKINSON.
BRAKE SHOE.
APPLICATION FILED NOV. 2, 1908.
1,042,896.
Patented Oct. 29, 1912.
4 SHEETS—SHEET 2.
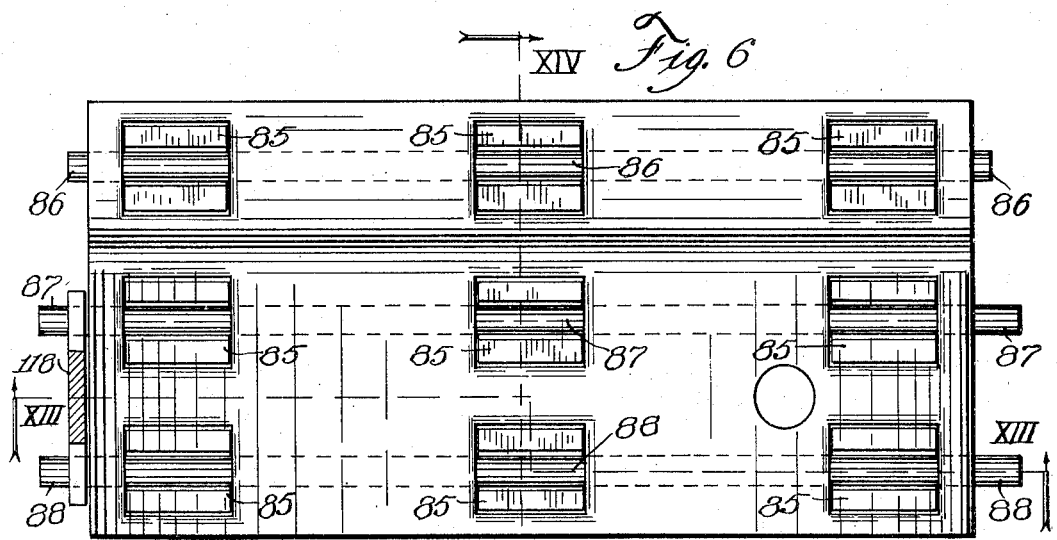
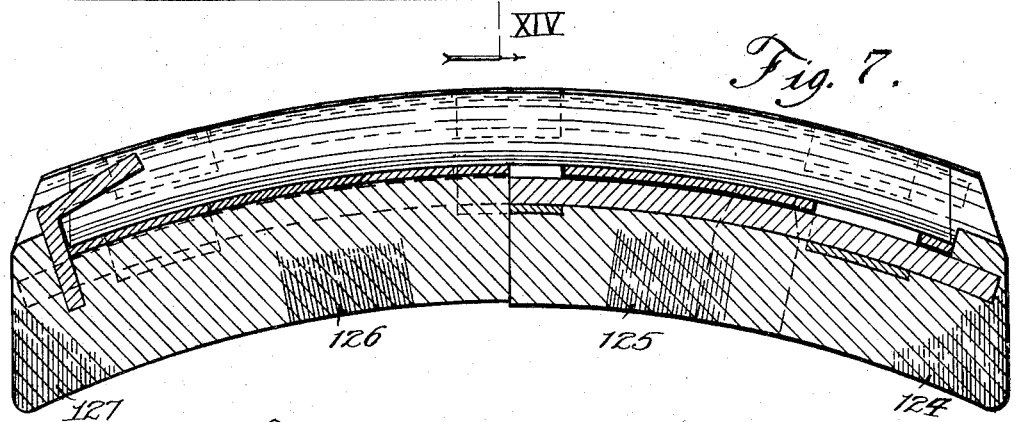
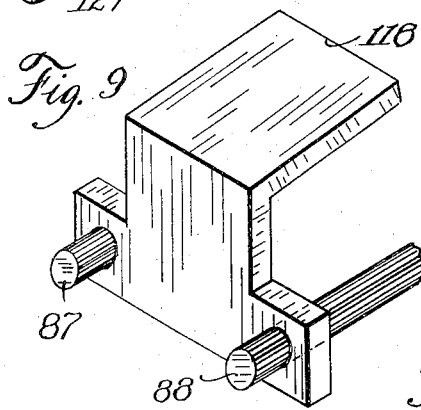
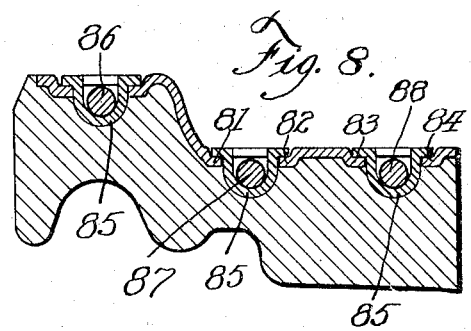
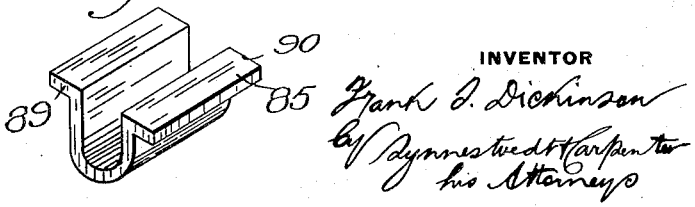

F. T. DICKINSON.
BRAKE SHOE.
APPLICATION FILED NOV. 2, 1908.
1,042,896.
Patented Oct. 29, 1912.
4 SHEETS—SHEET 3.
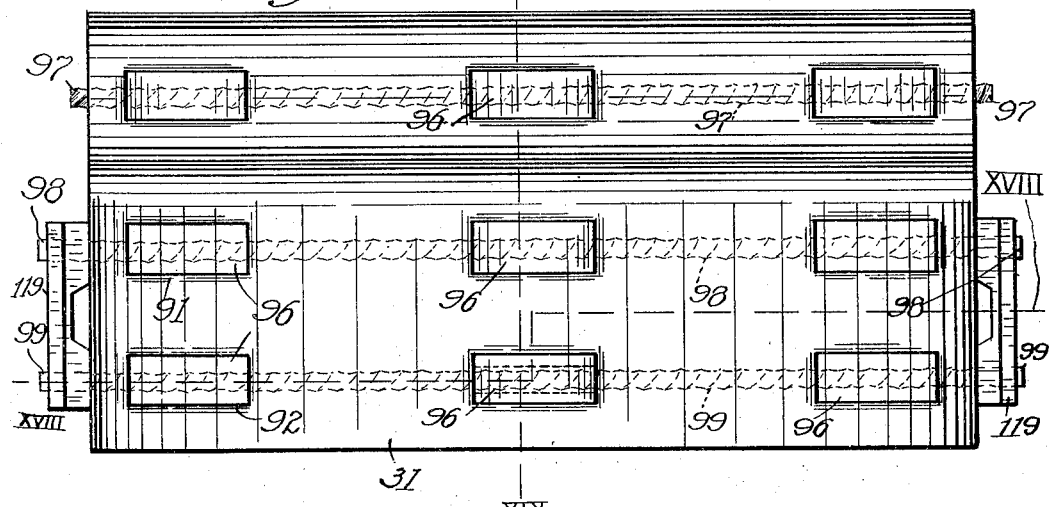
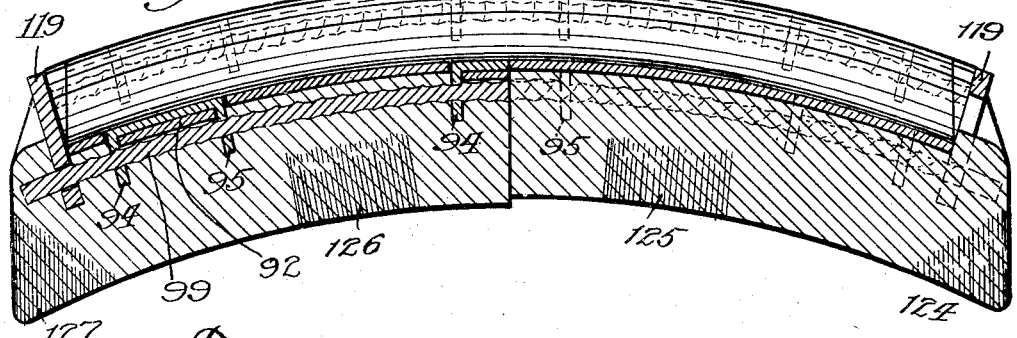
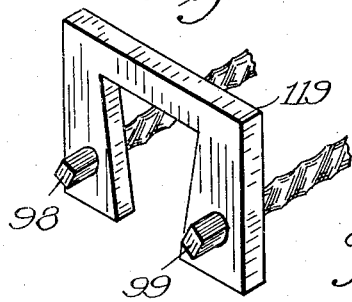
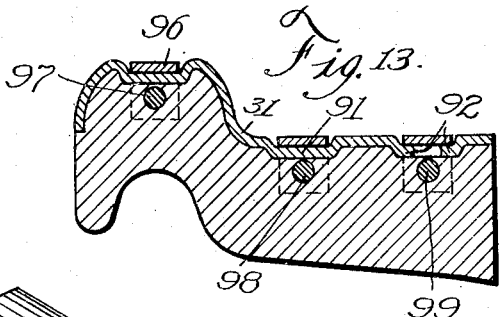
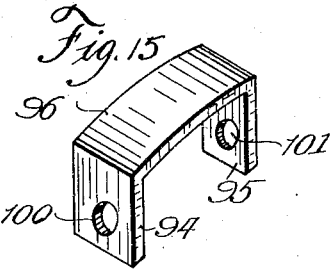
WITNESSES
INVENTOR
Frank T. Dickinson F. T. DICKINSON.
BRAKE SHOE.
APPLICATION FILED NOV. 2, 1908.
1,042,896.
Patented Oct. 29, 1912.
4 SHEETS—SHEET 4.
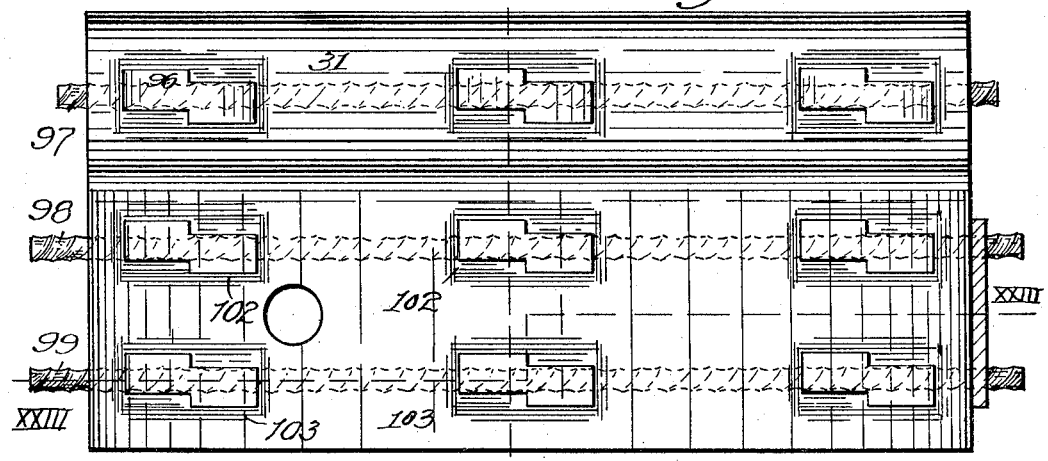
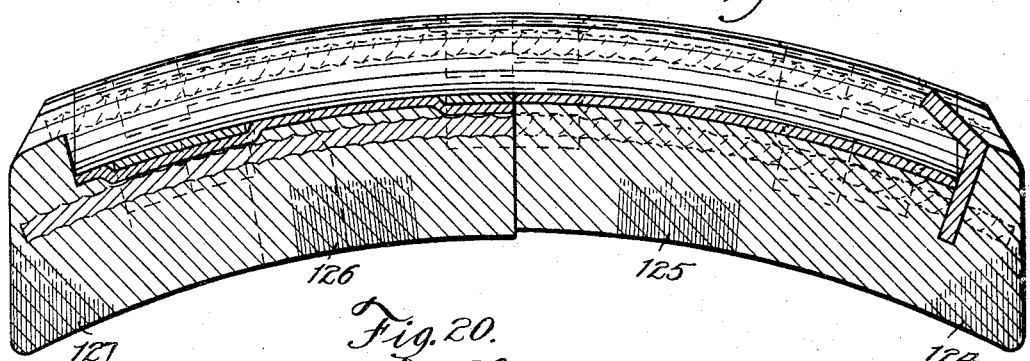
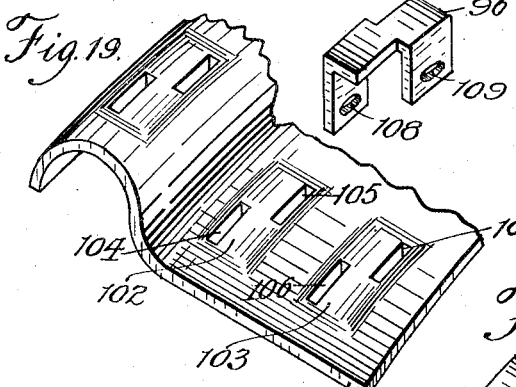
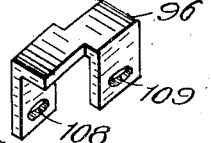
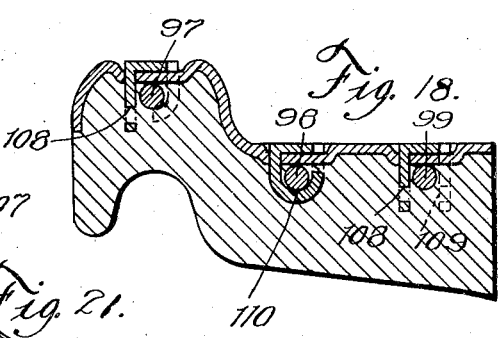
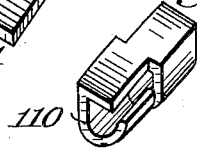
WITNESSES
INVENTOR

UNITED STATES PATENT OFFICE.

FRANK T. DICKINSON, OF CHICAGO, ILLINOIS.

BRAKE-SHOE.

1,042,896.     Specification of Letters Patent.     Patented Oct. 29, 1912.

Application filed November 2, 1908. Serial No. 460,586.

*To all whom it may concern:*

Be it known that I, FRANK T. DICKINSON, a citizen of the United States, residing at Chicago, in the county of Cook and State of Illinois, have invented certain new and useful Improvements in Brake-Shoes, of which the following is a specification.

This invention relates to the brake shoes or wearing blocks such as are universally employed upon the brakes of railway cars and locomotives and particularly to the types of such shoes as are provided with a strengthening back for the prevention of breakage and consequent dropping of parts of the shoe upon the rail, such back being usually constructed of sheet or cast steel.

The principal objects of my invention are the provision of a back of improved form, of great strength and rigidity, and a back having a lug for the attachment of the shoe to the brake head made integral with such back; the provision of improved means for attachment of the back to the body of the shoe, and the improvement of the form of the back, so that it may be firmly anchored in the cast metal of which the body of the shoe is formed, to the end that although the cast body may become fractured in many places, no part thereof will become disengaged from the back: the provision of improved means separate from the back itself for anchoring the back in the cast body and at the same time making the shoe more rigid and less liable to fracture; the provision of improved means for anchoring the hook used in connection with certain types of brake heads; the provision of certain harder surfaces in the body of the shoe arranged on such parts of the shoe as normally tend to receive the most wear and cause the shoe to wear away unevenly, together with such other objects and advantages as will hereinafter appear. To attain these objects I have provided the construction which I have illustrated in preferred form in the accompanying drawings wherein—

Figure 1 is a plan view of a brake shoe embodying my invention; Fig. 2 is a sectional elevation taken along the line II—II of Fig. 1; Fig. 3 is a sectional elevation taken on the line III—III of Fig. 1; Figs. 4 and 5 are respectively plan and edge views of the blank from which the retaining hook illustrated in Fig. 2 is made; Fig. 6 is a plan view illustrative of the reinforcing back and coöperating rods and the clips whereby the rods and back are maintained in relative position; Fig. 7 is a section taken on the line XIII of Fig. 6; Fig. 8 is a section taken on the line XIV of Fig. 6; Fig. 9 is a perspective view of the brake head hook used in connection with the construction illustrated in Figs. 6 and 7; Fig. 10 is a perspective illustration of the retaining clip used to hold the rods and back of Fig. 6 in relative position; Figs. 11 to 15 are views corresponding to Figs. 6 to 10 and illustrate certain modifications, Fig. 12 being taken on the line XVIII of Fig. 11, and Fig. 13 being taken on the line XIX of Fig. 11; Figs. 16, 17 and 18 are views similar to Figs. 6, 7 and 8 illustrative of certain modifications, Fig. 17 being taken on line XXIII of Fig. 16, and Fig. 18 being taken on line XXIV of Fig. 16; Fig. 19 is a perspective view of one end of the steel back illustrated in Fig. 16; Figs. 20 and 21 are perspective views of the retaining clips used in connection with the back of Figs. 16 and 19 for holding the same and the rods used in connection therewith in relative position.

For the purpose of attaining the highest possible measure of economy in the manufacture and use of brake shoes and in order to provide as far as possible that the frictional surface of the shoe may be fully worn off before the shoe is discarded, and simultaneously to provide against breakage of the body of the shoe when worn or fractured by accident, and thereby prevent the broken parts of the shoe from falling between the wheel and the rail, with ensuant danger of derailment it is the approved brake shoe practice to provide cast brake shoes with steel reinforcing members at the back of the shoes, and it has been my object to arrange means for securing such back to the wearing surface in a safe and inexpensive manner. To attain this object as well as certain others which I have heretofore referred to, I provide the reinforcing back 31, preferably made of sheet steel or other tough malleable metal, that part of the back which corresponds to the tread of the wheel being substantially flat in cross section while that part which corresponds to the flange of the wheel is curved as will be apparent from Fig. 3, the whole being curved longitudinally to a degree substantially conformable to the curvature of the wheel to which the shoe is to be applied.

To provide for the attachment of the reinforcing back to the body of the shoe parts are cut out of the back as indicated at 40, 41, 42, 43, 44, 45, 46, 47, 48, 49, 50, 52, and 53 and adjacent parts of the metal depressed as indicated at 54, 55, 56, 57, 58, 59, 60, 61 and 62, (see Fig. 1), in order to allow the placing of the rods 62, 63 and 64, under the metal of the back but over the depressed portions 54, 55, 56, 57, 58, 59, 60, 61 and 62, so that when the body of the shoe is cast upon the back, the back and body will become firmly united by the flowing of the metal of the body around the inserted rods 62, 63 and 64 as will be clearly seen in Fig. 3, the metal having also flowed through the cut out portions 40 to 53 and embodied the depressed portions within the cast portion of the shoe.

Referring to Figs. 1 and 6 it will be noted that if it be desired that the cast metal of the body of the shoe does not come to the surface of the back or engage any portion of the metal of such back directly, the back may be provided with cut out portions the edges of which are depressed as indicated at 81, 82, 83 and 84, (Fig. 8), and a retaining clip, 85, (see Fig. 10), inserted at such cut out portions and the rods 86, 87 and 88 placed under the back and over the clips before pouring the body of the shoe, so that when the shoe is poured, the body will embrace the rods and the back and body will thereby become firmly fixed relatively to each other, at the same time a plain surface will be presented by the back as the clips 85 are provided with the shoulders 89 and 90 adapted to rest upon the portions 81 and 82 which have been depressed to a degree corresponding to the thickness of the clips.

Referring to Figs. 11 to 15, and Figs. 16 to 21 inclusive, wherein I have illustrated modifications of the forms of retaining clips, it will be apparent that in Fig. 11 it is necessary merely to depress the metal of the back as indicated at 91 and 92 and provide such depressions with apertures adapted to receive the downturned ends 94 and 95 of the clip 96 illustrated in Fig. 15. In this construction, before the shoe is cast, the clips are inserted in position as indicated in Fig. 13 and the rods 97, 98 and 99 are passed through the apertures indicated at 100—101 in Fig. 15, so that in the act of casting the metal of the body of the shoe it will embrace the said rods and thereby firmly hold the back and body in juxtaposition.

Referring to Figs. 16 to 21 it will be noted that I have here illustrated a further modification of the retaining clips which is especially useful where it is found desirable to use connecting rods and a twisted or other irregular form, and at the same time this modification has the advantage of arranging the cut out portions in rows which are relatively staggered, so that the metal of the reinforcing back may not be weakened. In this form of construction I provide the back with depressions as indicated at 102 and 103 and cut out portions of such depressions as indicated at 104, 105, 106, and 107. With this type of construction I make use of a construction of retaining clips wherein the clips have on their sides, at the diagonally opposite ends, downturned portions which may be provided with apertures for engagement with the cast metal, as indicated at 108 and 109, (see Fig. 20), or such down turned portions may be bent around the connecting rod after the same has been placed in the proper position relatively to the back as illustrated in Figs. 18 and 21 at 110.

Referring to Fig. 4 it will be seen that by bending the blank 111 at substantially right angles on the lines 112 and 113 a hook may be formed for the reception of the brake head, owing to the cut out portions indicated at 114 and 115, when such hook is placed beneath the steel back and in proper position relatively to the connecting rod, it will become firmly embedded in the body of the metal at the time the shoe is poured.

It will be observed on reference to Fig. 2 that the outer lug or end portion of the shoe against which the brake head abuts may be strengthened by turning up the ends of the rods 62, 63 and 64 as indicated at 116 and 117. It will also be apparent to those who are skilled in the art to which my invention pertains that by the use of my improved form of construction, the ends of the rods 87 and 88, (see Fig. 9), 98 and 99 (see Fig. 14) may be readily used to form a positive anchorage for the brake head lug 118 or key way or staple 119 used in attaching the various types of brake heads to brake shoes.

While I have illustrated my invention as applied to the driver shoes which are used on railroad locomotives, it will be obvious to those who are skilled in the art that my inventions are equally applicable to both plain and flanged car shoes.

Having thus described my invention and illustrated its use, what I claim as new and desire to secure by Letters Patent is the following:

1. A brake shoe comprising a reinforcing back provided with depressed loops, a rod extending through the loops, and a wearing face cast so as to surround the rod in the loops.

2. In a brake shoe in combination, a reinforcing back, a rod engaging said back, and a cast wearing surface engaging said rod.

3. A brake shoe comprising a sheet steel reinforcing back provided with an attaching lug and with a plurality of depressed loops, a rod extending through the loops, and a wearing face cast so that the cast metal surrounds the rod and extends into the loops.

4. A brake shoe comprising a reinforcing back, a clip engaging said back, a rod engaging said clip and a cast wearing face engaging said rod.

5. A brake shoe comprising a reinforcing back, apertures in said back to receive the connecting clip, a connecting clip engaging said apertures, a rod engaging said connecting clip, and a cast body engaging said rod.

6. A brake shoe comprising a reinforcing back, adjacent apertures in said back, the metal between said apertures being depressed, a reinforcing rod extending through the apertures and a cast wearing face, all so arranged that as the wearing face is cast on the back, the molten metal passes through the apertures and engages the depressed portion of the back.

7. A brake shoe comprising a reinforced back and aperture in said back, a connecting clip filling said aperture, a rod passing between said clip and the back, and a cast wearing face, all so arranged that the said clip and rod will prevent the molten metal from flowing on to the outer surface of the back as the shoe is cast.

8. A brake shoe comprising a sheet steel reinforcing back provided with an attaching lug and with a depressed loop on each side of the lug, a rod extending beneath the lug and through the two loops and a wearing face cast so that the cast metal surrounds the rod and extends into the loops.

9. A brake shoe comprising in combination, a cast wearing face and a reinforcing back, the said back being provided with depending attaching loops engaging the cast wearing face, said loops having one of their edges extending longitudinally of the back separate from said back.

In testimony whereof I have hereunto signed my name in the presence of the two subscribed witnesses.

FRANK T. DICKINSON.

Witnesses:
MICHAEL J. STARK,
PAUL CARPENTER.